United States Patent [19]
King

[11] Patent Number: 6,027,241
[45] Date of Patent: Feb. 22, 2000

[54] MULTI VISCOSITY MIXING APPARATUS

[75] Inventor: Leonard Tony King, Long Beach, Calif.

[73] Assignee: Komax Systems, Inc., Wilmington, Calif.

[21] Appl. No.: 09/302,981

[22] Filed: Apr. 30, 1999

[51] Int. Cl.[7] .................................................. B01F 5/06
[52] U.S. Cl. .................. 366/181.5; 366/339; 366/340; 138/38; 165/109.1
[58] Field of Search ................. 366/181.5, 318, 366/321, 337–340; 138/37–39; 165/109.1, 160, 184

[56] References Cited

U.S. PATENT DOCUMENTS

| | | | |
|---|---|---|---|
| 1,496,345 | 6/1924 | Lichtenthaeler | 366/181.5 |
| 1,626,487 | 4/1927 | Warren | 366/181.5 |
| 1,776,135 | 9/1930 | Smith . | |
| 1,893,484 | 1/1933 | Belt . | |
| 2,000,953 | 5/1935 | Hokker et al. | 366/339 |
| 2,081,043 | 5/1937 | Kuhni . | |
| 2,508,247 | 5/1950 | Giauque . | |
| 2,784,948 | 3/1957 | Pahl et al. | 366/339 |
| 2,816,518 | 12/1957 | Daggett | 366/339 |
| 2,831,754 | 4/1958 | Manka | 366/181.5 |
| 3,643,735 | 2/1972 | Huggins | 165/184 |
| 3,923,288 | 12/1975 | King . | |
| 4,053,141 | 10/1977 | Gussefeld | 366/339 |
| 4,068,830 | 1/1978 | Gray | 366/340 |
| 4,371,036 | 2/1983 | Fordsmand . | |
| 4,408,890 | 10/1983 | Beckmann | 366/339 |
| 4,441,823 | 4/1984 | Power | 366/340 |
| 4,552,211 | 11/1985 | Weber . | |
| 4,614,440 | 9/1986 | King | 366/340 |
| 4,616,937 | 10/1986 | King | 366/339 |
| 4,674,888 | 6/1987 | Carlson | 366/337 |
| 4,753,535 | 6/1988 | King | 366/337 |
| 4,808,007 | 2/1989 | King . | |
| 4,812,049 | 3/1989 | McCall | 366/181.5 |
| 4,893,672 | 1/1990 | Bader . | |
| 4,998,583 | 3/1991 | Lahne et al. . | |
| 5,046,548 | 9/1991 | Tilly | 165/140 |
| 5,176,448 | 1/1993 | King et al. | 366/339 |
| 5,388,906 | 2/1995 | Rao | 366/340 |
| 5,597,236 | 1/1997 | Fasano | 366/338 |
| 5,765,946 | 6/1998 | Lott | 366/181.5 |
| 5,865,537 | 2/1999 | Streiff et al. | 366/337 |
| 5,947,597 | 9/1999 | King | 366/338 |

FOREIGN PATENT DOCUMENTS

| | | | |
|---|---|---|---|
| 1498545 | 8/1989 | U.S.S.R. | 366/340 |
| 1816489 | 5/1993 | U.S.S.R. | 366/181.5 |

*Primary Examiner*—Charles E. Cooley
*Attorney, Agent, or Firm*—Malcolm B. Wittenberg

[57] ABSTRACT

A stationary material mixing apparatus for mixing various components in a fluid stream. The mixing apparatus is in the form of a cone-shaped module containing a plurality of openings therethrough where within the openings are located mixing elements which induce a rotational angular velocity to the fluid stream. As preferred embodiments, the mixing apparatus, located within a conduit, can also contain a biscuit with further mixing elements and a series of either helically wound tubes or vanes further enhancing the mixing operation.

18 Claims, 4 Drawing Sheets

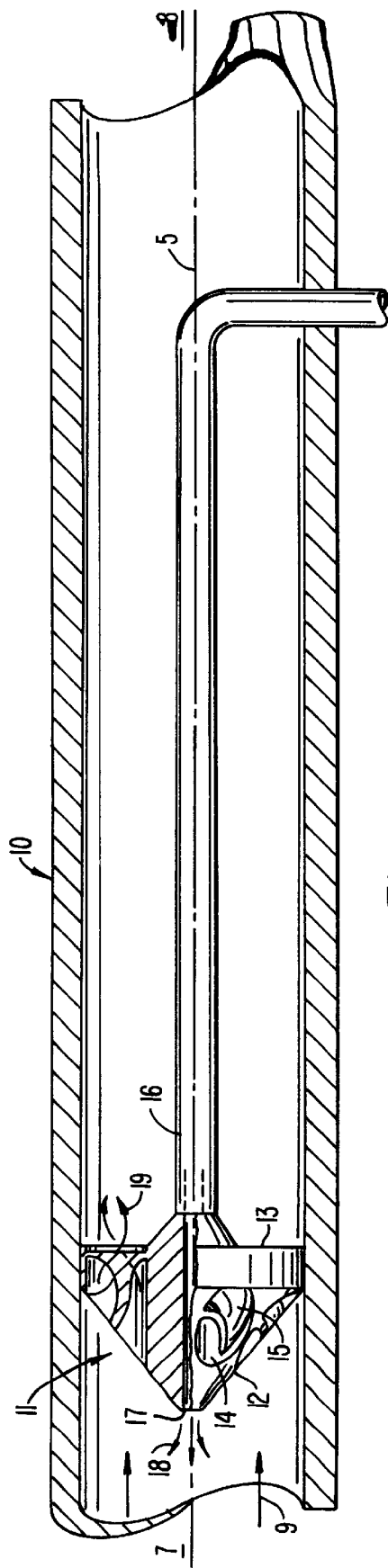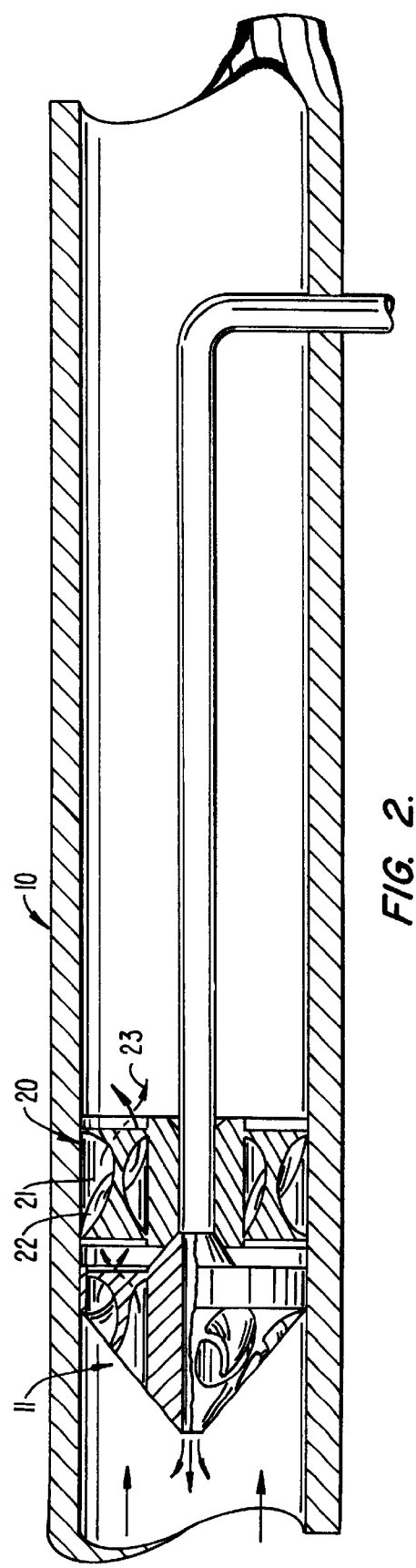

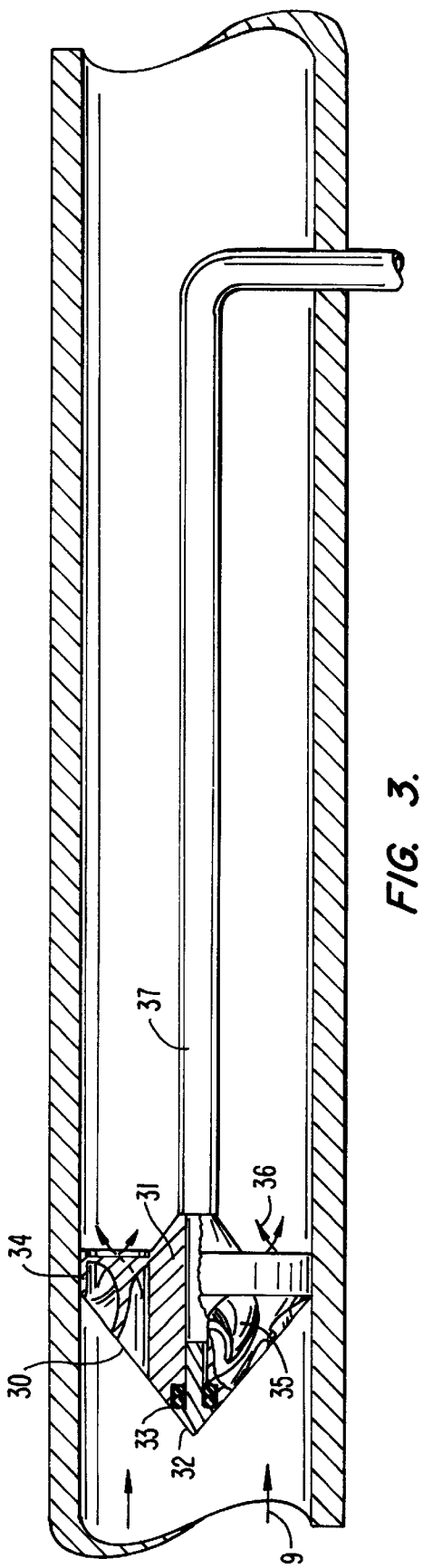
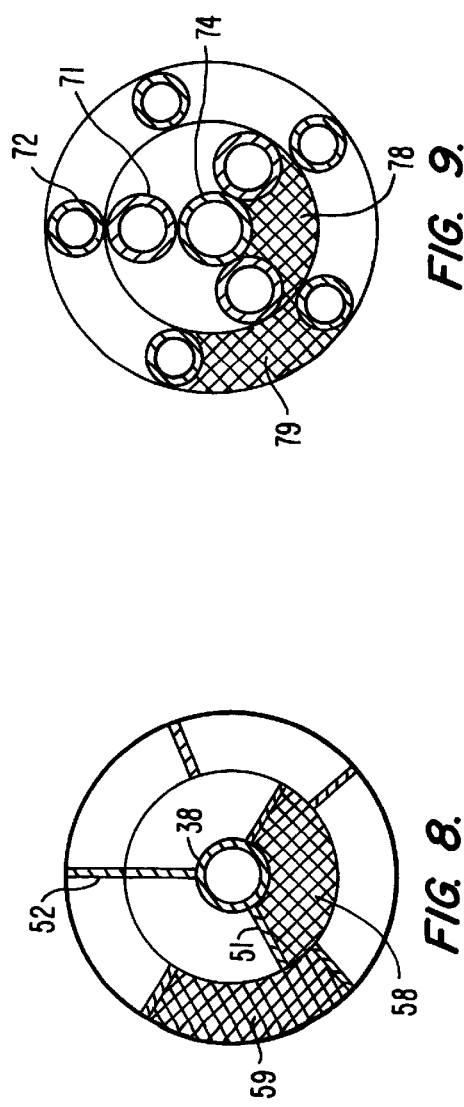
FIG. 3.
FIG. 8.
FIG. 9.

MULTI VISCOSITY MIXING APPARATUS

TECHNICAL FIELD OF INVENTION

The present invention deals with a material mixing apparatus which contains various elements traditionally known as static mixers for mixing components of a fluid stream. The mixer of the present invention is uniquely designed to enhance the mixing of a low viscosity component such as a colorant or dye into a high viscosity fluid stream such as a polymer melt.

BACKGROUND OF THE INVENTION

It has long been realized that static mixers, if made to work efficiently, provide certain economic advantages over dynamic mixers for, as the name implies, static mixers employ no moving parts. As such, static devices are generally less expensive to configure and certainly much less expensive to maintain while providing the user with an extended useful life for the mixer product in service.

Prior art approaches to static mixers have generally involved expensive machining, molding, casting or other fabrication of the component mixer elements coupled with some type of permanent attachment between elements and a conduit and/or between elements within a conduit. The resulting cost and difficulty of manufacture results in a relatively expensive end product. Moreover, many of the prior mixers provide less than complete mixing particularly with respect to material flowing along the walls of the conduit. This so-called "wall-smearing" is related to the parabolic velocity profile of a fluid having laminar flow in a pipe where the fluid velocity is small or zero along the wall's surfaces.

As noted above, a mixing problem in industry is to use a motionless or static mixing system to mix a small quantity of low viscosity additive into a much larger volume of a very high viscosity material on a continuous in-line basis. A good example of this problem might be the introduction of 1% of a liquid colorant with a viscosity of 5 centipoise into the main continuous flow stream of a liquid polymer having a viscosity of 5 million or more centipoise.

The mixing of a low viscosity additive into a much larger volume of high viscosity material can be solved using a variety of commercially available motor-driven mechanical mixers or motionless mixers where the additive is introduced at the inlet to the mixer by a means of a "T" or similar connection. The considerable pressure drop and resulting energy required to pump very viscous products is usually supplied by means of a gear pump or an extrusion machine. Large pressure drops developed across the mixing device due to the high viscosities involved are typical on the order of 1,000 to 10,000 psi. This places severe physical demands on equipment and energy costs can be significant.

When an additive is introduced to the motionless mixer inlet in an unsophisticated fashion such as by means of a simple "T" connection, the additive enters the mixer as a single stream. Not until the additive has passed a distance of several pipe diameters into the mixer does it become distributed across the full pipe diameter. This means a large portion of the motionless mixer volume does not contribute to the mixing process but is wasted until a significant distance downstream is traveled by the additive before dispersion is complete. Only then can the main mixer complete the mixing task of dispersing the distributed additive throughout the main polymer flow with a fine structure adequate to meet the process requirements. In addition, this single stream of additive entering the mixer presents a very low interfacial area between it and the main flow. This minimizes or limits the contribution of mixing due to molecular diffusion.

Several devices have been developed to improve this entrance condition. These include the dual viscosity mixer disclosed in applicant's U.S. Pat. No. 4,808,007 as well as applicant's Special Injection and Distribution Device disclosed in applicant's U.S. Pat. No. 5,176,448. The dual viscosity mixer causes the additive to enter the main mixer as a thin sheet across the pipe diameter improving distribution modestly and substantially helping molecular diffusion due to the improved area to thickness ratio associated with a thin sheet rather than a simple narrow stream. Such a device exhibits a pressure drop given typically by the equation $\Delta P = 1.0 \times 10^{-5} \, Q\mu/D^3$ psi where Q is the flow rate in gpm, $\mu$ is the viscosity in cP and D is the inside diameter of the pipe. The mixing device shown in applicant's '448 patent significantly improves distribution with its 12 radial thin sheets but at a cost of significant pressure drop given by the equation $\Delta P = 5 \times 10^{-5} \, Q\mu/D^3$.

Other design approaches have been more crude consisting of an inlet sparger with multiple holes from which the additive is supposed to emerge. Multiple exit holes introduce more problems than they solve. Any assembly involving a plurality of parallel holes interconnected tends to plug asymmetrically. Both the dual viscosity mixer and the mixer disclosed in the '448 patent avoid this problem by using a single injection point for the additive. If plugging of the single additive point does occur, it can be cleared by the application of adequate pressure to the additive supply. In any device having many parallel connected holes, if the holes become plugged and pressure is applied to clear them, once one or two holes release an additive flow, the applied pressure drops and the remainder of the holes remain plugged.

Not surprisingly, when dealing with polymer melt systems, it is oftentimes advantageous to provide a means of efficiently creating a source of energy transfer within the mixing conduit to facilitate mixing and to maintain the melt at its appropriate viscosity. As such, in the present invention, applicant takes advantage of a device for effecting heat transfer from a first fluid medium to a second fluid medium and for enhancing mixing and uniform distribution of the second fluid medium within the confines of a conduit as disclosed in applicant's previously filed U.S. patent application Ser. No. 08/872,318 bearing a filing date of Jun. 10, 1997, the disclosure of which is incorporated by reference. Applicant's prior U.S. application Ser. No. 09/002,618 filed on Jan. 5, 1998, the disclosure which is incorporated by reference as well, employs helically wound vanes to produce uniform distribution of interstices throughout an available volume of conduit maximizing volume utilization in terms of interstice mixing regions for a given pressure drop.

All in all, applicant has incorporated various mixing technologies to produce a mixing device uniquely applicable to the mixing of fluids of widely contrasting viscosities in a most efficient manner.

SUMMARY OF THE INVENTION

The present invention deals with a device for enhancing uniformity of fluids within a moving fluid stream within the confines of a conduit. The conduit is characterized as having a substantially circular cross section, a longitudinal axis, fluid inlet and fluid outlet. The stationary material mixing apparatus of this invention provides for mixing an additive into a fluid stream moving from an upstream location to a downstream location within the conduit which comprises a cone-shaped module with its apex pointing toward the upstream end of the conduit. A series of openings are provided within the cone-shaped module emanating from the side wall of the cone to its base for the passage of a fluid stream therethrough. Each opening is provided with a mixing element which induces a rotational angular velocity to the fluid stream passing therethrough. An additional feed line located downstream of the material mixing apparatus is provided for introducing additive through the cone, emanating from the cone upstream of the above-noted series of openings so that the additive and fluid stream are caused to pass together through the series of openings for mixing.

BRIEF DESCRIPTION OF THE DRAWINGS

FIGS. 1–7 represent cross sections of conduit with various embodiments of the mixing apparatus of the present invention installed therein.

FIGS. 8 and 9 are cross sectional views taken along lines 8—8 of FIG. 5 and 9—9 of FIG. 7, respectively.

DETAILED DESCRIPTION OF THE INVENTION

Figure 4:
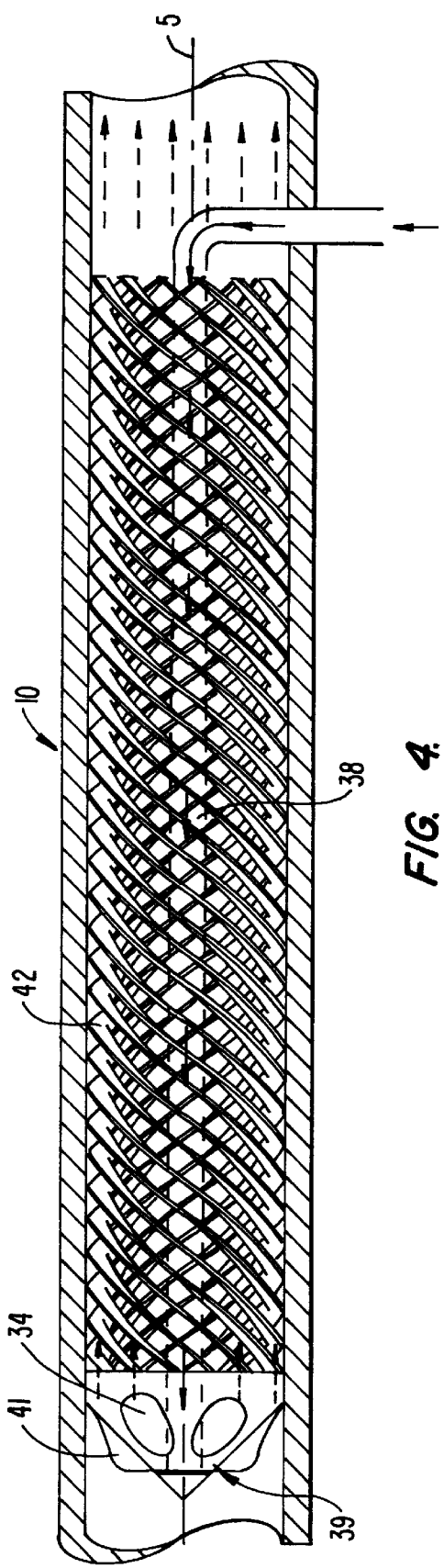

Turning first to FIG. 1, the present invention is shown installed within conduit 10 having upstream end 7 and downstream end 8 such that a fluid stream to which an additive is to be mixed is intended to progress within conduit 10 in the direction of arrows 9.

Conduit 10, having longitudinal axis 5 and a circular cross section houses cone-shaped module 11 employed to introduce an additive for mixing with the main fluid stream. Specifically, additive feed line 16 is intended to introduce the appropriate additive within the body of cone-shaped module 11 which, in the embodiment shown in FIG. 1, is discharged through opening 17 at the apex of cone-shaped module 11 where sloping side walls 12 would otherwise meet. As such, when the additive is discharged through opening 17, the additive is introduced countercurrent to the main fluid stream progressing in the direction of arrows 9 and is thus caused to proceed along sloping side walls 12 towards apertures 14.

In practicing the present invention, the main fluid stream and additive are intended to be mixed by passing them through a series of openings 14 emanating from side wall 12 and continuing through base 13. Typically, cone-shaped module 11 is provided with six such openings spaced evenly about longitudinal axis 5. Additive exiting cone-shaped module 11 in the direction of arrow 18 is distributed as thin radial sheets producing a larger interfacial surface area between the additive and main component flow within conduit 10. These components enter openings 14 confronting mixing elements 15 which induce a rotational angular velocity to the fluid stream passing therethrough. Such mixing elements can be those described in applicant's U.S. Pat. No. 3,923,288, the disclosure of which is incorporated by reference as well as those helical elements employed by Kenics in its Kenics static mixer.

As a further expedient in practicing the present invention, it is noted that additive feed line 16 can be employed of various lengths to satisfy the design needs of a user. For example, as additive feed line 16 is lengthened along longitudinal axis 5, one would increase heat transfer between the additive and the main fluid flow within conduit 10. As such, a longer feed line 16 would result in the additive emanating from opening 17 be closer to the temperature of main product flow entering conduit 10 in the direction of arrow 9.

An effective mixer can be produced strictly by employing the elements shown in FIG. 1. The additive and main fluid passing through openings 14 under the influence of mixing elements 15 will assume an angular velocity as depicted by arrows 19. However, to enhance the mixing operation further, reference is made to FIG. 2 which shows the use of an additional mixing element 20. This second mixing device comprises a biscuit aligned along longitudinal axis 5, again having a circular cross section substantially equal to that of the base of cone-shaped module 11. Biscuit 20 is further provided with a series of openings 21 ideally being of equal size and number and alignment to the series of openings 14 of the cone-shaped module. In addition, each of the openings in biscuit 20 is provided with a mixing element 22 of the type described above which would again induce a rotational angular velocity to the fluid stream passing therethrough. As such, the fluids exiting biscuit 20 depicted by directional arrows 23 would be even further mixed.

As noted previously, the stationary material mixing apparatus shown in FIGS. 1 and 2 has been configured by providing module 11 with opening 17 at its apex for the introduction of additive to be mixed. In certain environments, this might present a drawback for opening 17 is directly exposed to oncoming main fluid flow passing in the direction of arrows 9. This could cause clogging of opening 17 or, alternatively, allow for the passage of main product flow within cone-shaped module 11. As an alternative embodiment, reference is made to FIG. 3 which shows cone-shaped module 30 configured in two parts, base member 31 and apex portion 32. In the embodiment shown in FIG. 3, apex portion 32 is frictionally fit within base portion 31 and seated through the use of O-rings 33. As such, when there is no hydraulic pressure created by the introduction of an additive through additive feed line 37, apex portion 32 remains seated upon base portion 31. However, when sufficient hydraulic pressure is imposed through feed line 37, additive is caused to seep from the interface between apex 32 and base 31 as shown schematically by fluid trails 41 (FIG. 4). As was previously the case, fluid emanating from this interface proceeds over the sloping walls of cone-shaped module 30 entering openings 34 and mixing elements 35 only to exit cone-shaped module 30 as shown schematically by arrows 36.

Figure 5:
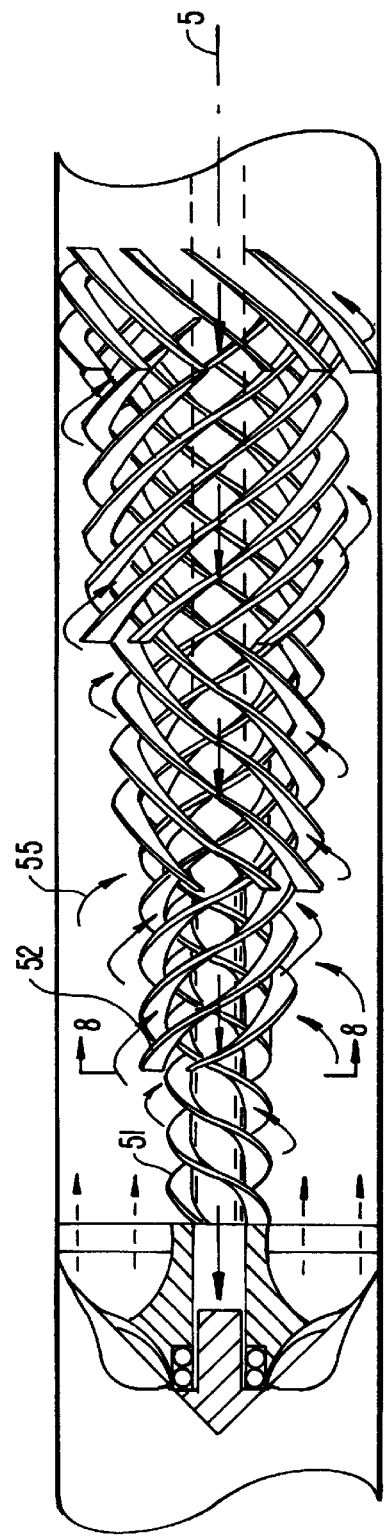

As a further expedient and preferred embodiment of the present invention, reference is made to FIGS. 4 and 5. As in the previous embodiments, additive feed line 38 is shown introducing additive to cone-shaped module 39, the module being a two-part configuration as illustrated in FIG. 3 although the embodiment of FIGS. 1 and 2 could work equally as well in this environment.

FIGS. 4 and 5 show the incorporation of a series of vanes 42 downstream of cone-shaped module 39 for enhancing the uniformity of fluids within the moving fluid stream contained within conduit 10.

Additive inlet pipe 38 acts as a mandrel for the application of a first layer of vanes 51 (FIG. 5) which are helically wound about pipe 38, the inner diameter of the first set of vanes 51 being substantially co-extensive with the outer diameter of feed inlet pipe 38. As noted in FIGS. 4 and 5, each of vanes 51 and 52, etc. is, as a preferred embodiment, applied at a constant angle to longitudinal axis 5, the ideal angle being 45°.

As best depicted in FIG. 5, the buildup of additional sets of vanes 52 etc. uses the previous set of vanes as a mandrel. As such, second layers of vanes 52 is wound about first layer of vanes 51 such that the second layers of vanes has an inner diameter substantially co-extensive with the outer diameter of the first layer of vanes. As noted from the figure, the vanes of the second layer 52 are of a substantially constant angle to longitudinal axis 5 wherein the sign of each layer of vanes are opposite to the adjacent layer of vanes so that interstices are created between adjacent layer at vanes which are substantially constant along the length of additive inlet pipe 38. As such, if each layer of vanes is applied at an approximate 45° angle to longitudinal axis 5, interstices are created between adjacent layers of vanes of a 90° angle facilitating the mixing of main flow and additive emanating from cone-shaped module 39 as depicted schematically by arrows 55.

As a further preferred embodiment, reference is made to FIG. 8 showing the cross section of the mixing device of FIG. 5 along lines 8—8. It is noted that first row of vanes 51 started adjacent feed line 38 are positioned equidistant around the feed line to create first areas 58 defined by radial spaces between the first row of vane starts. The second row of vanes 52 are wound about the first row of vanes 51 and are positioned equidistant about the first row of vanes to create second areas 59 as defined by radial spaces between the second row of vane starts wherein the first areas and the second areas 58 and 59, respectively are substantially equal. As noted in FIG. 8, this is accomplished by providing three vane starts in the first row and five vane starts in the second. By operating in this fashion, one is able to equalize the hydraulic pressure of fluid moving within conduit 10 throughout the space occupied by vanes 42.

Figure 6:
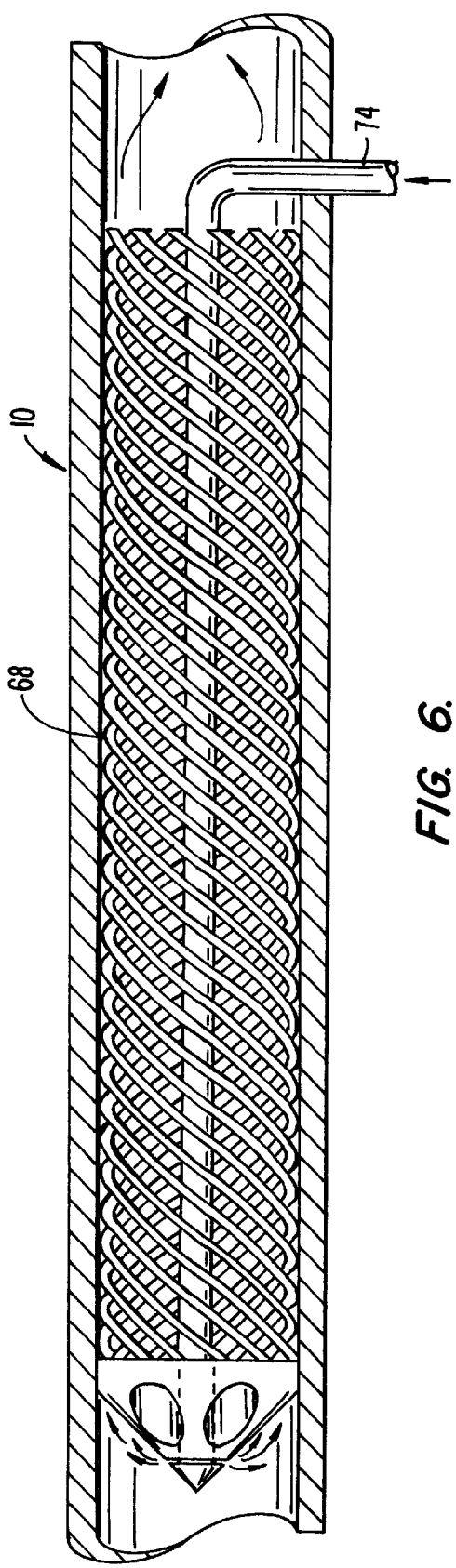
Figure 7:
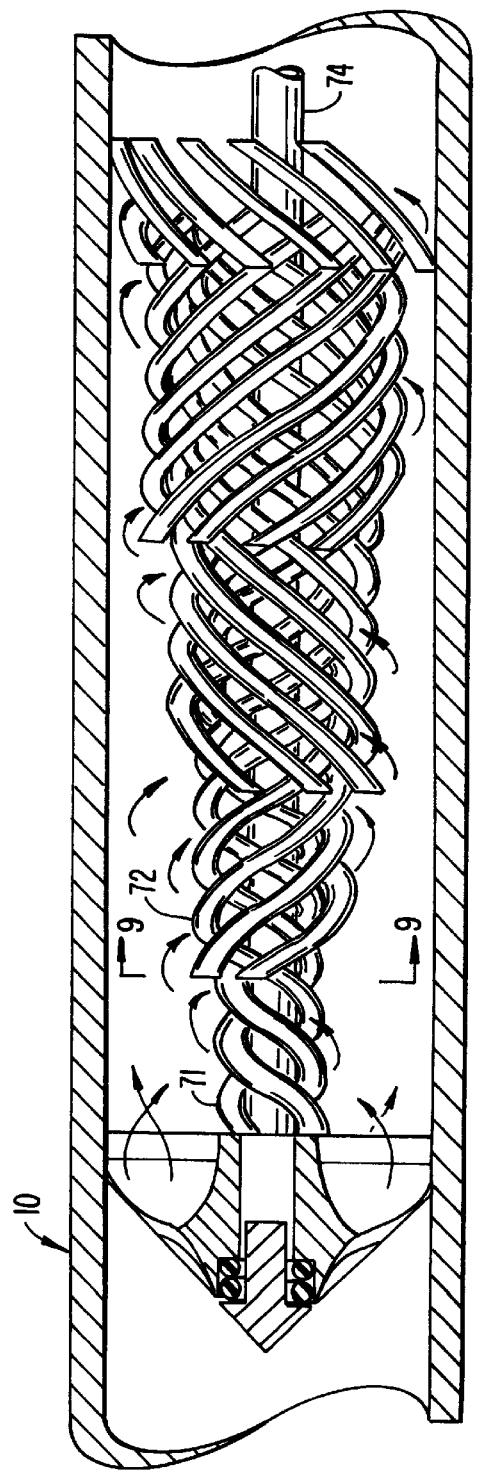

As yet a further expedient, reference is made to FIGS. 6 and 7. In this embodiment, instead of applying vanes 42 downstream of conically shaped module 39, a series of helically arranged tubes 68 are applied over additive feed line 74 used as a mandrel. The buildup of the various tubular layers is carried out in a fashion corresponding to the buildup of vanes 42. Specifically, first level of tubes 71 are helically applied at preferably a constant angle to longitudinal axis 5 over additive feed line 74 used as a mandrel. A second layer of tubes 72 are built upon first layer of tubes 71 using the first layers of tubes as a mandrel for the second layer. Providing the second layer of tubes at an equal but opposite sign to the first layer, a series of interstices are created noting that if the various tubular layers are applied at a constant 45° angle to longitudinal axis 5, the interstices themselves form an angle of 90° between adjacent tubular layers. Further by analogy to the discussion of vanes 42, the mixing apparatus depicted in FIG. 9 depicts first row of tubes 71 started adjacent to feed line 74 and positioned equidistant around the feed line to create first areas 78 defined by radial spaces between first row of tube starts while the second row of tubes is wound about the first row and are positioned equidistant about the first row to create second areas 79 defined by radial spaces between second row of tube starts wherein first areas 78 and second areas 79 are substantially equal. As shown, if the first row of helically wound tubes comprises three tube starts, the second row of helically wound tubes would comprise five tube starts in order to keep areas 78 and 79 equal.

Both vanes 42 and tubes 68 perform the function of enhancing uniformity of fluids emanating from either conically shaped element 39, alone, or the combination of conically shaped element 39 and biscuit 20 (FIG. 2) as the fluid progresses downstream within conduit 10. One might choose to employ tubes 68 rather than vanes 42 if provision is made to introduce a heating or cooling fluid within tubes 68 to further control the temperature of the fluid within the conduit. Although not shown, tubes 68 can be provided with their own fluid entrance and exit lines in order to facilitate appropriate temperature control.

I claim:

1. A stationary material mixing apparatus located within a cylindrically-shaped conduit, said conduit having an upstream end and a downstream end and a circular cross section and longitudinal axis located along its geometric center, said material mixing apparatus provided for mixing an additive into a fluid stream moving from said upstream to said downstream ends within the conduit, said mixing apparatus comprising a cone-shaped module with its apex pointing toward the upstream end of the conduit and having a series of openings emanating from the side wall of the cone to its base for the passage of said fluid stream therethrough, each opening being provided with a mixing element which induces a rotational angular velocity to the fluid stream passing therethrough, an additive feed line located downstream of said material mixing apparatus for introducing additive through said cone and emanating from said cone upstream of said series of openings so that said additive and said fluid stream are caused to together pass through said series of openings for mixing.

2. The mixing apparatus of claim 1 wherein the cone-shaped module is configured with an opening at its apex for the introducing of said additive therethrough.

3. The mixing apparatus of claim 1 wherein said cone-shaped module is configured into two parts, a first comprising a base portion through which said series of openings are configured and an apex portion fit within said base portion.

4. The mixing apparatus of claim 3 wherein said additive is introduced to the interior of said conduit between said base portion and apex portion of said cone-shaped module upstream of said series of openings.

5. The mixing apparatus of claim 1 wherein said feed line is located along said longitudinal axis.

6. The mixing apparatus of claim 5 wherein said feed line is of sufficient length to allow for heat transfer between said fluid stream and said additive.

7. The mixing apparatus of claim 1 further comprising a second mixing device located downstream of said cone-shaped module, said second mixing device comprising a biscuit aligned along said longitudinal axis, said biscuit having a circular cross section substantially equal to the base of said cone-shaped module and a series of openings substantially equal in size and number and alignment to the series of openings in said cone-shaped module, said openings in said biscuit further being provided with mixing elements which induce a rotational angular velocity to the fluid stream passing therethrough.

8. The mixing apparatus of claim 7 wherein said additive feed line passes through an opening in said biscuit at said longitudinal axis.

9. The mixing apparatus of claim 1 further comprising at least two helically wound rows of tubes, a first row being wound about said feed line and said second row being wound about said first row.

10. The mixing apparatus of claim 9 wherein each row of said tubes being helically wound about said feed line are wound at equal and uniform angles to said longitudinal axis so that interstices created between said helically wound rows of tubes are substantially constant along the length of said feed line.

11. The mixing apparatus of claim 10 wherein each row of tubes is composed of a series of helical turns, each turn being approximately 45° to said longitudinal axis wherein the first row of tubes is of a helical sign opposite to the helical sign of the second row of tubes.

12. The mixing apparatus of claim 9 wherein said first row of tubes are started adjacent to said feed line and positioned equidistant around said feed line to create first areas defined by radial spaces between first row of tube starts and said second row of tubes being wound about said first row of tubes are positioned equidistant about said first row of tubes to create second areas defined by radial spaces between second row of tube starts wherein said first areas and said second areas are substantially equal.

13. The mixing apparatus of claim 12 wherein said first row of helically wound tubes comprises three tube starts and said second row of helically wound tubes comprises five tube starts.

14. The mixing apparatus of claim 1 further comprising at least two helically wound rows of vanes, a first row being wound about said feed line and said second row being wound about said first row.

15. The mixing apparatus of claim 14 wherein each row of said vanes being helically wound about said feed line are wound at equal and uniform angles to said longitudinal axis so that interstices created between said helically wound rows of vanes are substantially constant along the length of said feed line.

16. The mixing apparatus of claim 15 wherein each row of vanes is composed of a series of helical turns, each turn being approximately 45° to said longitudinal axis wherein the first row of vanes is of a helical sign opposite to the helical sign of the second row of vanes.

17. The mixing apparatus of claim 14 wherein said first row of vanes are started adjacent to said feed line and positioned equidistant around said feed line to create first areas defined by radial spaces between first row of vane starts and said second row of vanes being wound about said first row of vanes are positioned equidistant about said first row of vanes to create second areas defined by radial spaces between second row of vane starts wherein said first areas and said second areas are substantially equal.

18. The mixing apparatus of claim 17 wherein said first row of helically wound vanes comprises three vane starts and said second row of helically wound vanes comprises five vane starts.

* * * * *